United States Patent [19]

Klein et al.

[11] Patent Number: 5,377,734

[45] Date of Patent: Jan. 3, 1995

[54] HIGH EFFICIENCY ALL TERRAIN BICYCLE OR MOTORCYCLE TIRE

[75] Inventors: Gary G. Klein; Darrell W. Voss, both of Chehalis, Wash.

[73] Assignee: Klein Bicycle Corporation, Chehalis, Wash.

[21] Appl. No.: 805,516

[22] Filed: Dec. 13, 1991

[51] Int. Cl.⁶ .............................................. B60C 11/11
[52] U.S. Cl. ............................................... 152/209 R
[58] Field of Search ............... 152/209 R, 209 D, 450, 152/548; D12/135–150

[56] References Cited

U.S. PATENT DOCUMENTS

| | | | |
|---|---|---|---|
| D. 238,767 | 2/1976 | Dartois | D12/136 |
| D. 277,091 | 1/1985 | Sakaki | D12/136 |
| D. 332,931 | 2/1993 | Marui | D12/136 |

FOREIGN PATENT DOCUMENTS

| | | | |
|---|---|---|---|
| 0198102 | 12/1982 | Japan | 152/209 D |
| 0093609 | 6/1983 | Japan | 152/209 D |
| 0170603 | 10/1983 | Japan | 152/209 D |
| 0045205 | 2/1990 | Japan | 152/209 D |

OTHER PUBLICATIONS

"Tioga Trail Dawg" Mountain Bike Action; Oct. 1991; p. 147.
"Tioga Hound Dawg" Mountain Bike Action; Oct. 1991; p. 147.
"Tioga Mud Dawg" Mountain Bike Action; Oct 1991; p. 147.
"Specialized Ground Control Extreme S" Mountain Bike Action; Jan 1990, p. 68.
"Tioga Wonder Dawg Tire" Mountain Bike Action, Oct. 1991; p. 197.
"Specialized Ground Control" Mountain Bike Action, Jun. 1991; p. 7.
"Onza Porcupine ATB Tire" Mountain Bike Action, Jan 1990; p. 68.
"Panaracer Timbur II"; Mountain & City Biking; p. 54; Jan. 1990.
"Wolber Chamcnix" Mountain Bikes Action, Jan. 1990, p. 69.
"Maximum" Joe Murray; Mountain Bike Action; Jan. 1990 p. 18.
"Li Hsin 559" Mountain Bike Action, Apr. 1990; p 122.
"Li Hsin 565" Mountain Bike Action, April 1990; p. 122.
"Li Hsin 567" Mountain Bike Action, Apr. 1990; p. 122.
"Li Hsin 568" Mountain Bike Action, Apr. 1990; p. 122.
"Li Hsin 569"Mountain Bike Action, Apr. 1990; P. 122.
"Li Hsin 572" Bicycle Business Journal; Sep. 1989 p. 83.
"Matrix Single Track Comp L" Mountain & City Biking; May 1990 p. 103.
"Kenda" American Bicyclist; May 1990; p. 22.
"Odyessey Renegade" Mountain Bike Action; Jan 1990; p. 69.
"Cyclers Motivator" Mountain Bike Action; Jan 1990; p. 70.

Primary Examiner—Michael W. Ball
Assistant Examiner—Nancy T. Krawczyk
Attorney, Agent, or Firm—Jim Zegeer

[57] ABSTRACT

A high efficiency all terrain bicycle or motorcycle tire having a tread design in which spaced tread blocks are arranged in circumferential rows and overlapped to allow a smooth shift in load from one tread block to another in different circumferential rows with a minimum of casing hysteresis and at the same time provide a low rotating mass, low rolling resistance, high cornering adhesion with high consistency across differing types of ground conditions, high motive and stopping traction. The tread blocks in the different rows have shapes, spacings and orientations which createa plurality of tortous paths for flow of material without excessive constricting of flow in any one spot.

9 Claims, 10 Drawing Sheets

"Front" tire in pure side "cornering" or sloping terrain Force

"Front" tire in braking on medium side slope or during cornering or used in the rear (direction of rotation reversed) motive force on medium side slope or during cornering "Front" tire in braking on medium side slope or during "cornering" or used in the rear (direction of rotation reversed) motive "Front" tire in light braking on steep side slope or hard cornering or used in the rear (direction of rotation reversed) light motive force on steep side slope or during hard cornering "Front" tire used in the rear (direction reversed) under braking and cornering or medium side slope forces.

Force

HIGH EFFICIENCY ALL TERRAIN BICYCLE OR MOTORCYCLE TIRE

BACKGROUND AND BRIEF DESCRIPTION OF THE INVENTION

The invention is directed to tires for bicycles, motorcycles and other two-wheeled vehicles, more particularly the invention is directed to a large section, lightweight, supple all terrain cycle tire with specially designed tread to provide low rolling resistance, high stopping traction, high cornering traction, high motive traction, and high off-angle traction with a high degree of self cleaning of the tread in all ground conditions, including wet or mud. In one preferred embodiment, one tread design is intended for the front or rear tire of the bicycle or motorcycle, and another tread design is specifically for the rear.

An all terrain cycle tired needs to perform the following functions:

1. protect the wheel rim from impact damage due to irregular surfaces or sharp objects that are encountered.
2. provide a cushion or suspension function between the ground and the bicycle frame, to improve the ride comfort as well as to increase traction and reduce rolling resistance.
3. provide adhesion to the ground surface for motive traction, braking, and cornering forces, and to resist slipping on angled surfaces.
4. support the weight of the cycle and rider. This requires casing and tread layer of adequate strength and material to contain both the air pressure needed to perform the above functions and resist without damage the typical sharp rocks and so forth that may puncture or cut a weak tire.

In a high performance all terrain cycle tire according to this invention, additional factors are to be optimized.

5. Provide a very light weight tire, for low rotating mass. This allows faster response for acceleration, steering, and suspension functions (smoother ride, better traction), as well as making it easier for the bike to climb uphill.
6. Low rolling resistance is desired. This is needed in order to achieve the maximum speed and distance out of a limited amount of available energy.
7. Very high cornering adhesion, with high consistency across differing types of ground conditions.
8. Very good stopping traction, also with a high degree of consistency across varying ground conditions.
9. Very high motive traction for the rear wheel, also with a high degree of consistency across varying ground conditions.
10. Self cleaning design, such that dirt, mud or rocks do not remain adhered to the tread surface or lodged in the spaces between tread blocks.

Most of the high performance tires commercially produced appear to be designed for or at least they work best on a narrow range of ground conditions and in most cases for dry hardpack or dry loose material. They use relatively large tread blocks oriented across the direction of travel in the center of the tire and some narrower blocks oriented longitudinally on either side of the tire.

The tire contact patch is approximately an elongated ellipse along the centerline of the tire. The side blocks typically are not touching the ground on a flat level hard surface with normal loading and pressure. Most of the tires on the market have the center tread pattern (that which is in contact with the flat level hard ground) arranged with some kind of surfaces perpendicular or at a steep angle to (near perpendicular) the direction of travel so as to provide motive traction and braking, with little attention to cornering forces. The typical tire then has some tread oriented in a direction with the direction of travel on the sides of the tire casing for "cornering". These tires work well in dry dirt, somewhat loose material to hard packed, and even moist dirt but not mud. The problems arise from the different friction characteristics of different soils and surfaces. In conditions of a layer of slippery wet clay over a firm base, the tire will begin slipping at a very mild cornering lean angle, the transverse oriented center tread blocks are still carrying most of the tire weight, and because of their orientation to the side load, act like well lubricated skis in the lateral direction. They have little or no bite into the surface. By the time the side tread are carrying substantial weight, it is usually too late to stop the tire from slipping, the typical close spacing between the side treads just load up with mud and continue to slip. A tire called the "Porcupine" consists of high truncated conical tread blocks in the center section of the tire. Because of block flex, this tire feels very unstable on hard surfaces such as rock or gravel, tending to bounce over them with out providing good grip. But the relatively tall, round blocks penetrate the surface of mud very well and provide good grip in the soft conditions as well as not loading the relatively large spaces between the tread blocks with mud.

DETAILED DESCRIPTION OF THE DRAWINGS

Figures 1, 2:
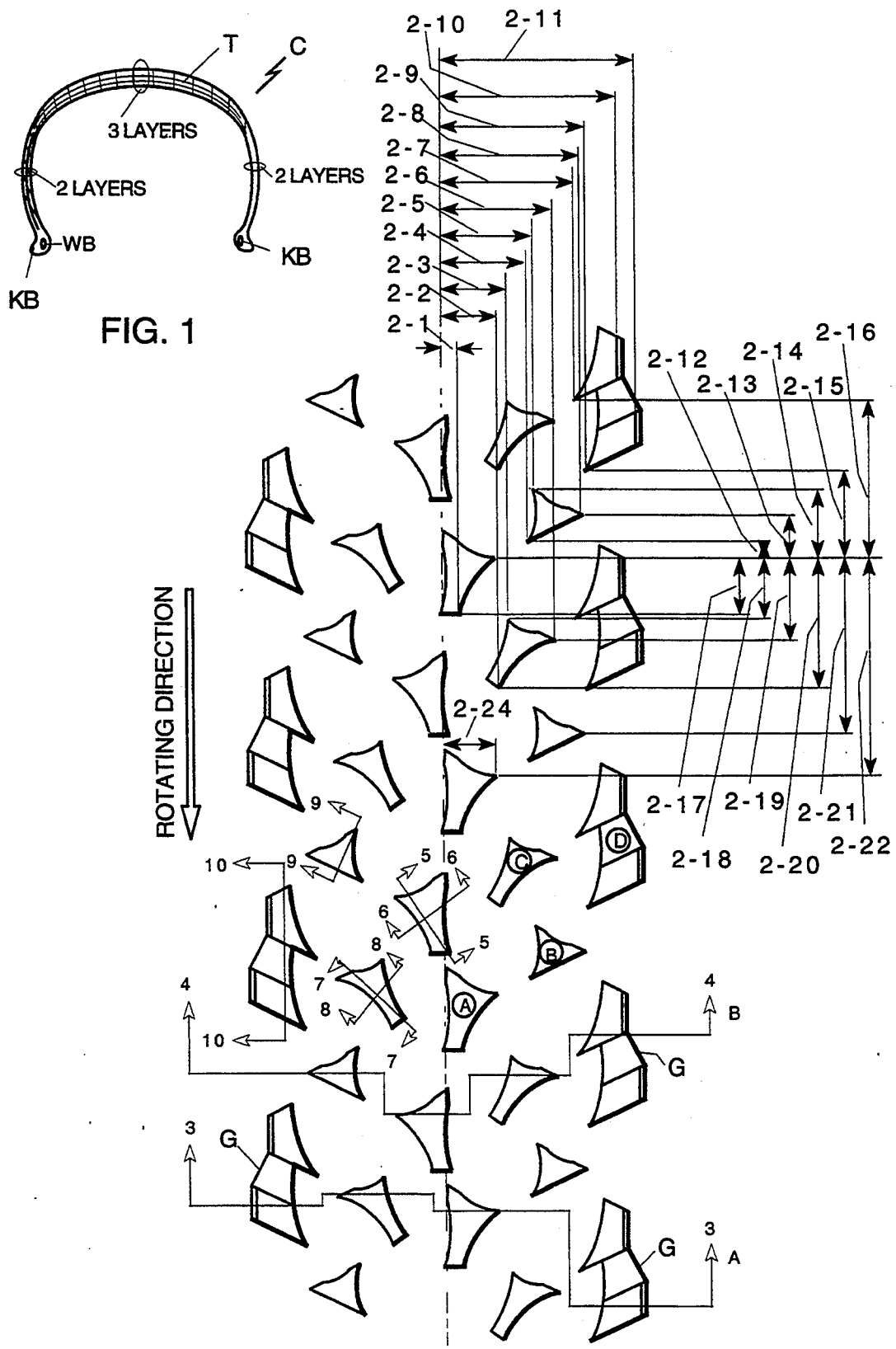
Figure 3:
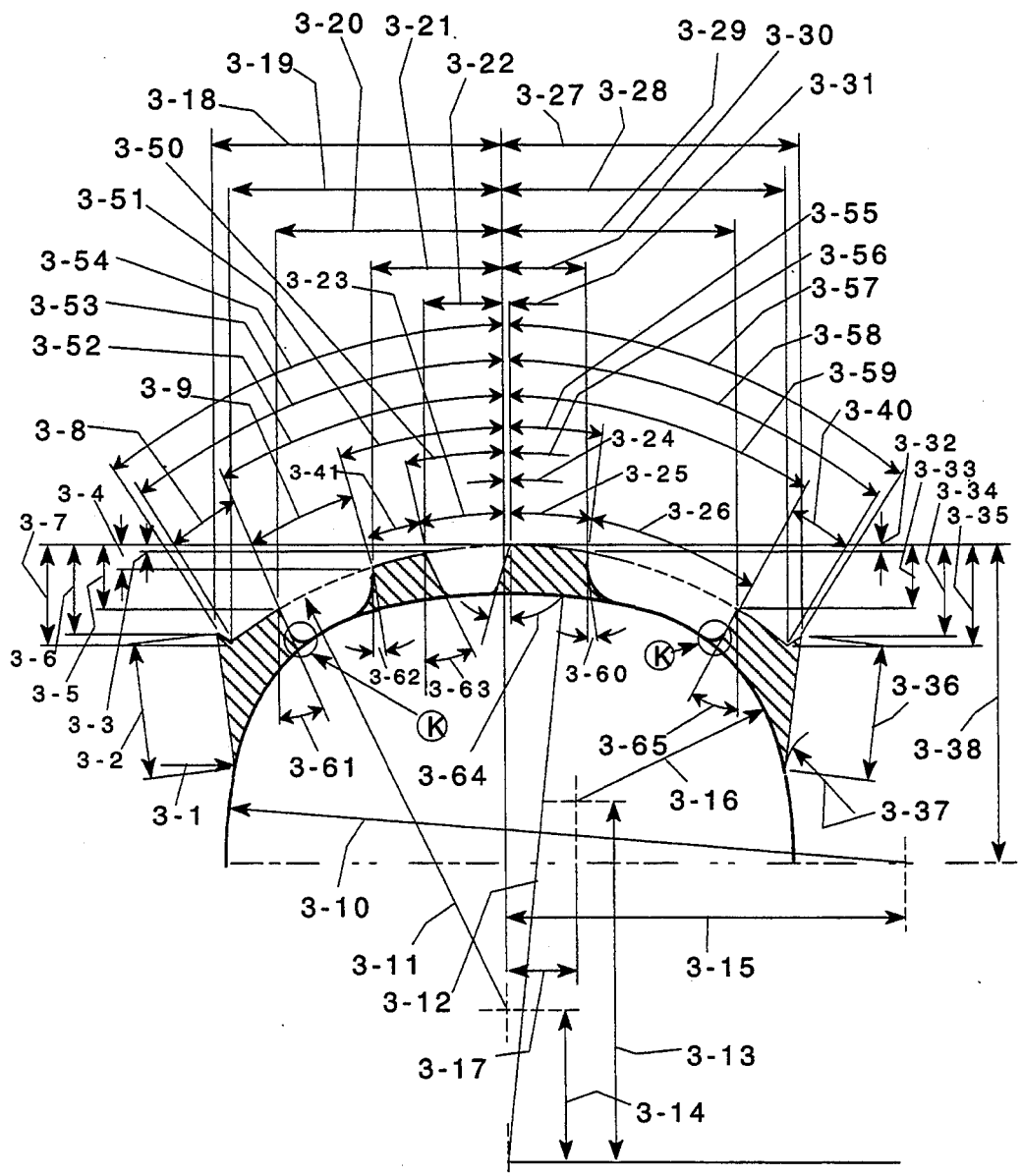
Figure 4:
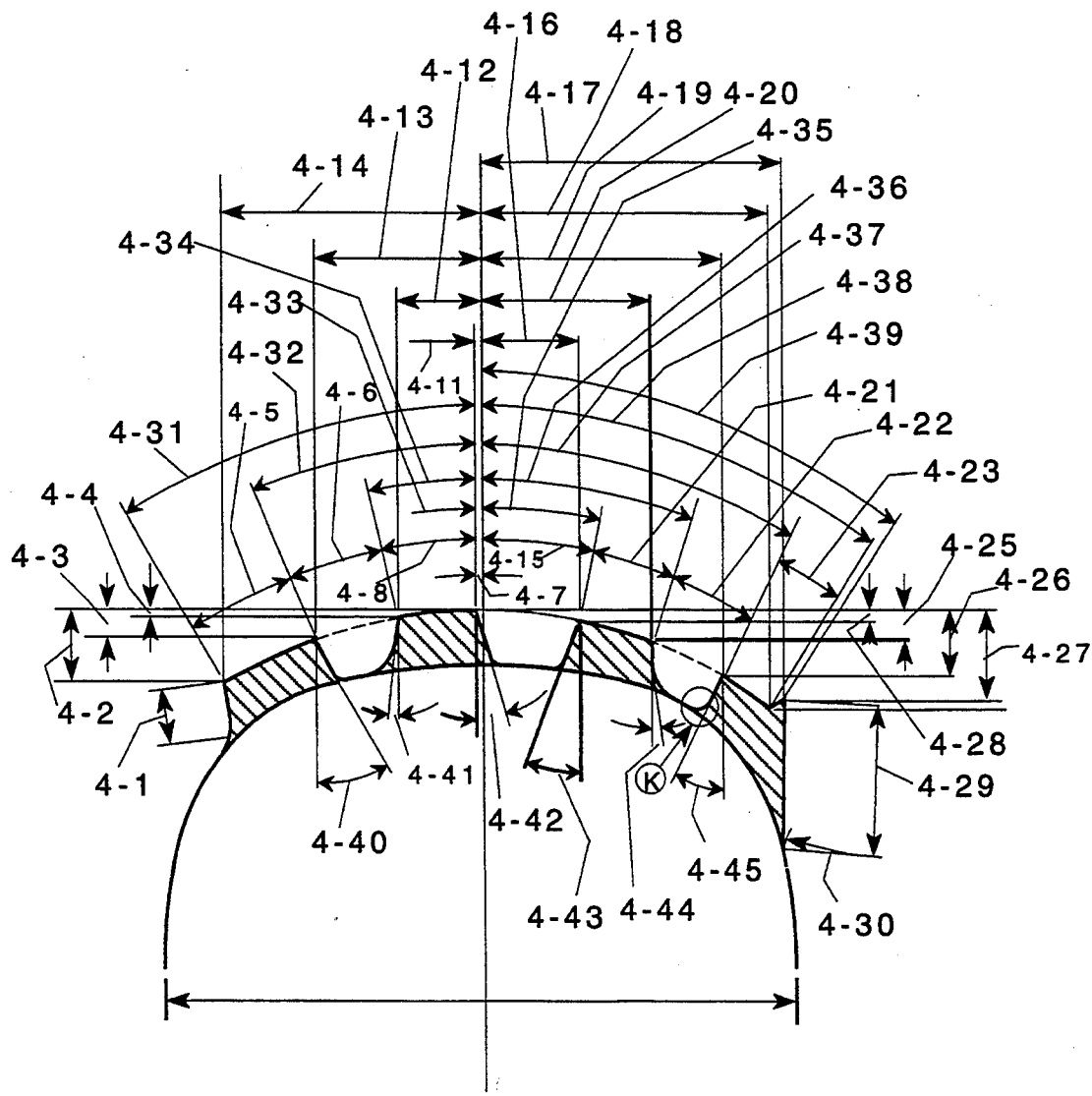
Figure 5:
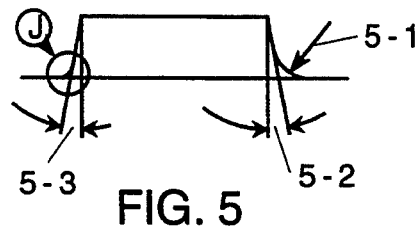
Figure 6:
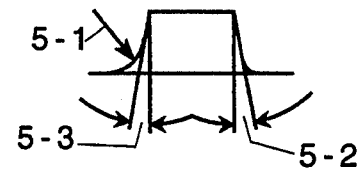
Figure 7:
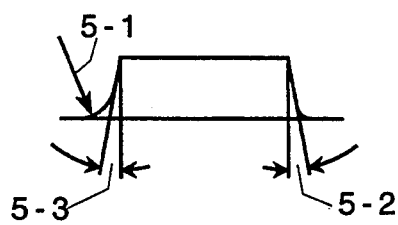
Figure 8:
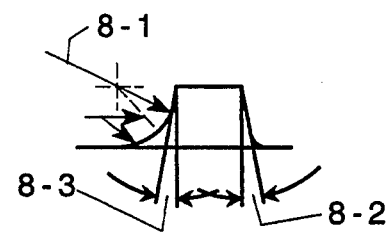
Figure 9:
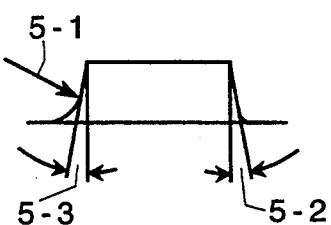
Figure 10:
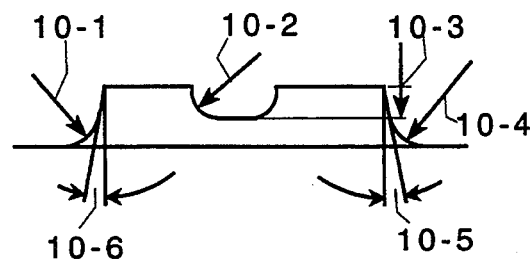
Figure 11A:
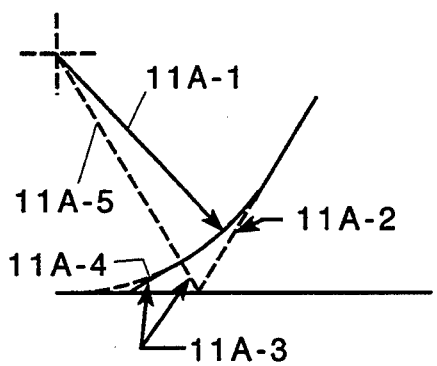
Figure 11B:
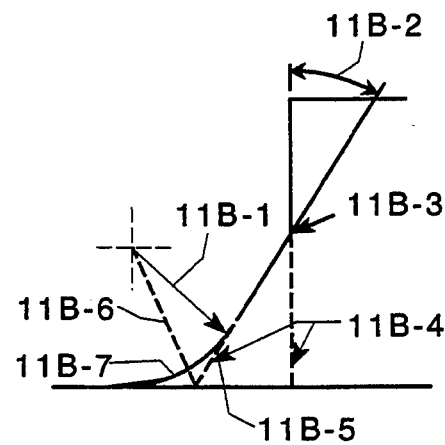
Figure 12:
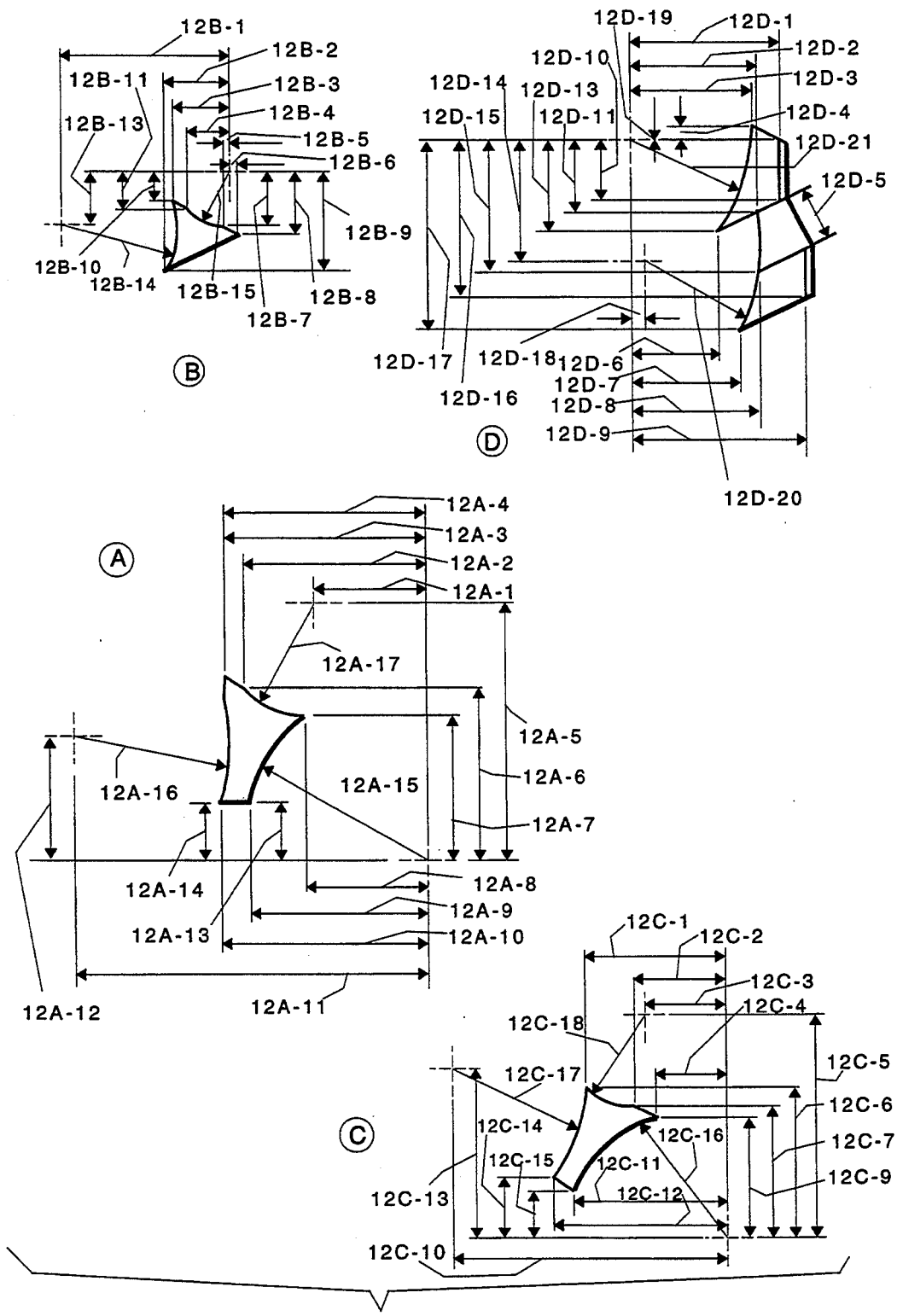
Figure 13:
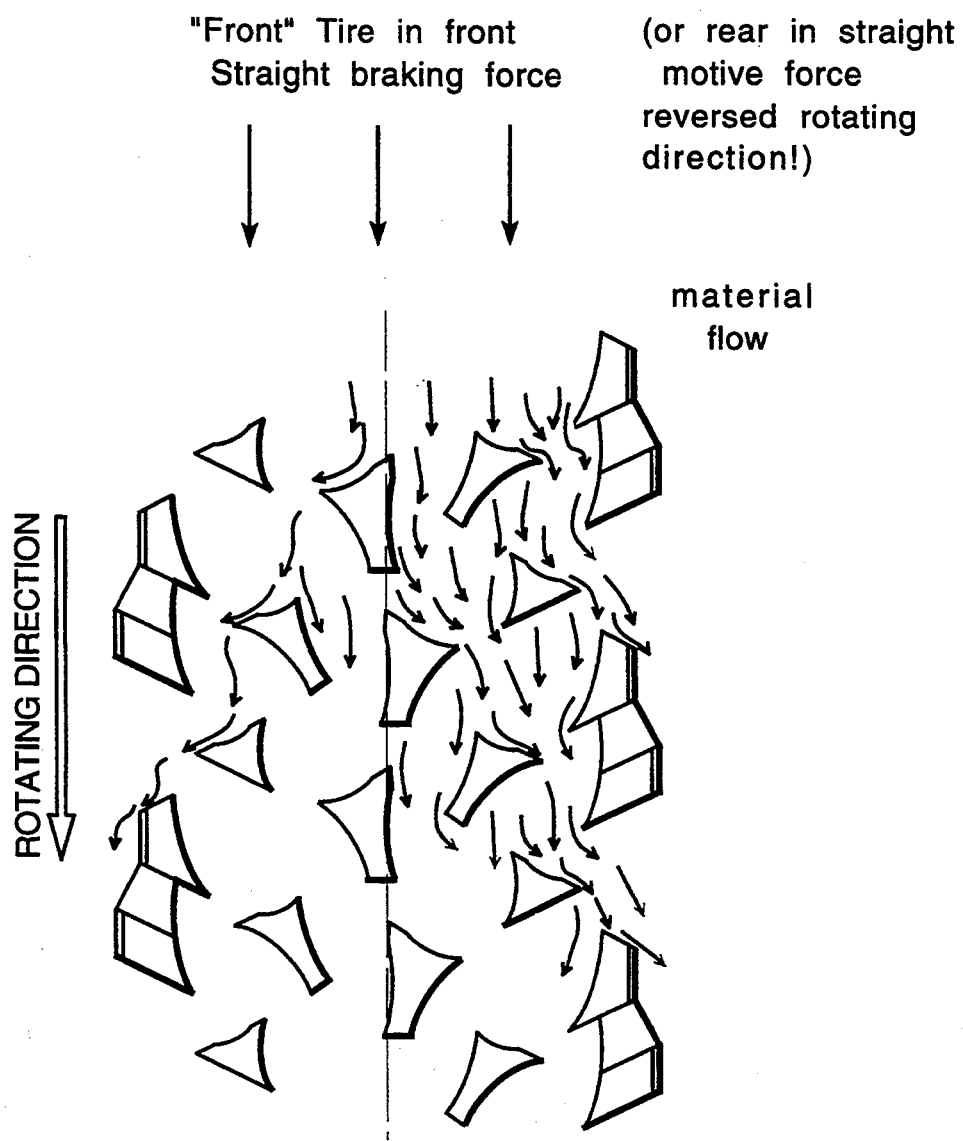
Figure 14:
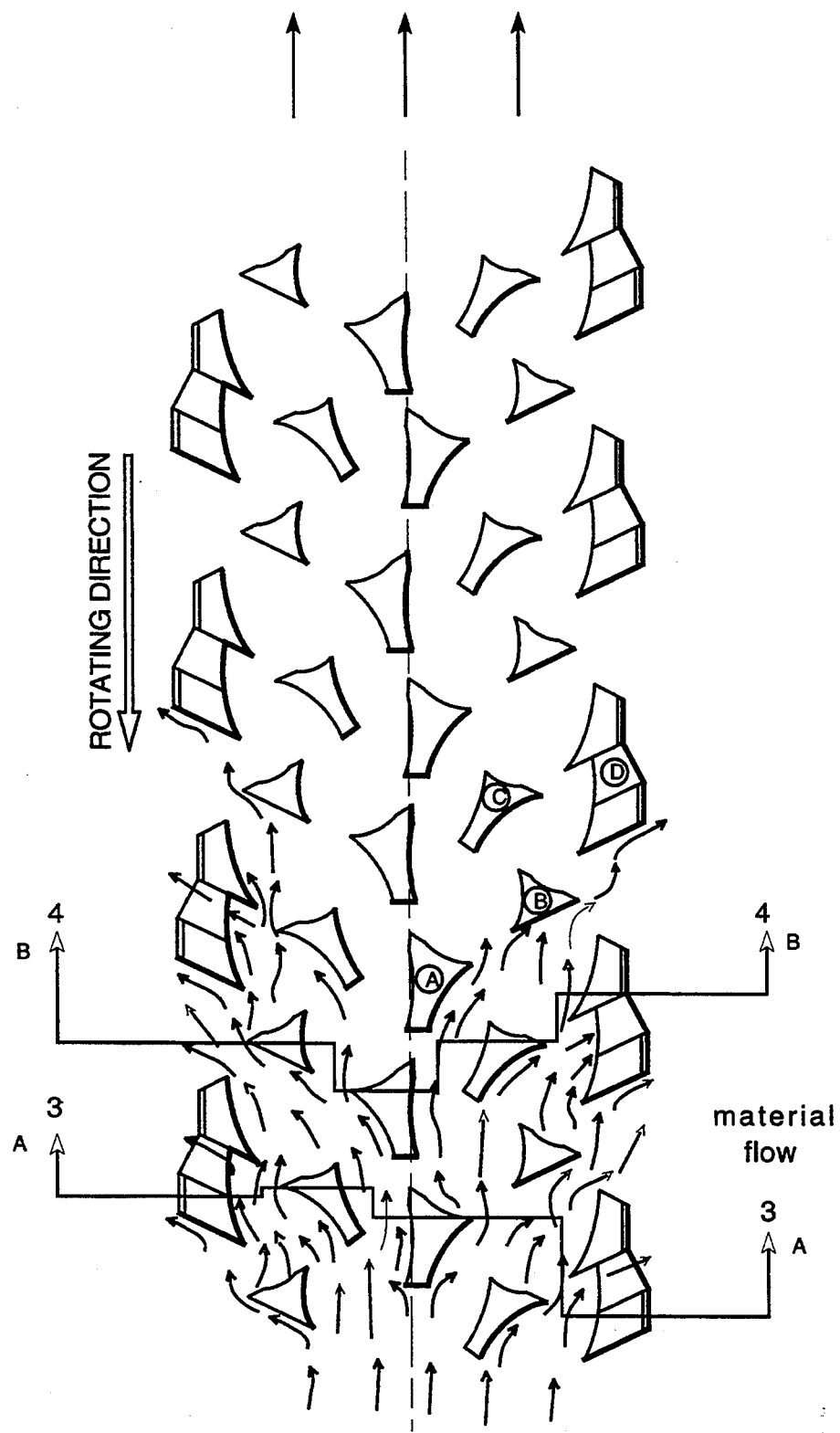
Figure 15:
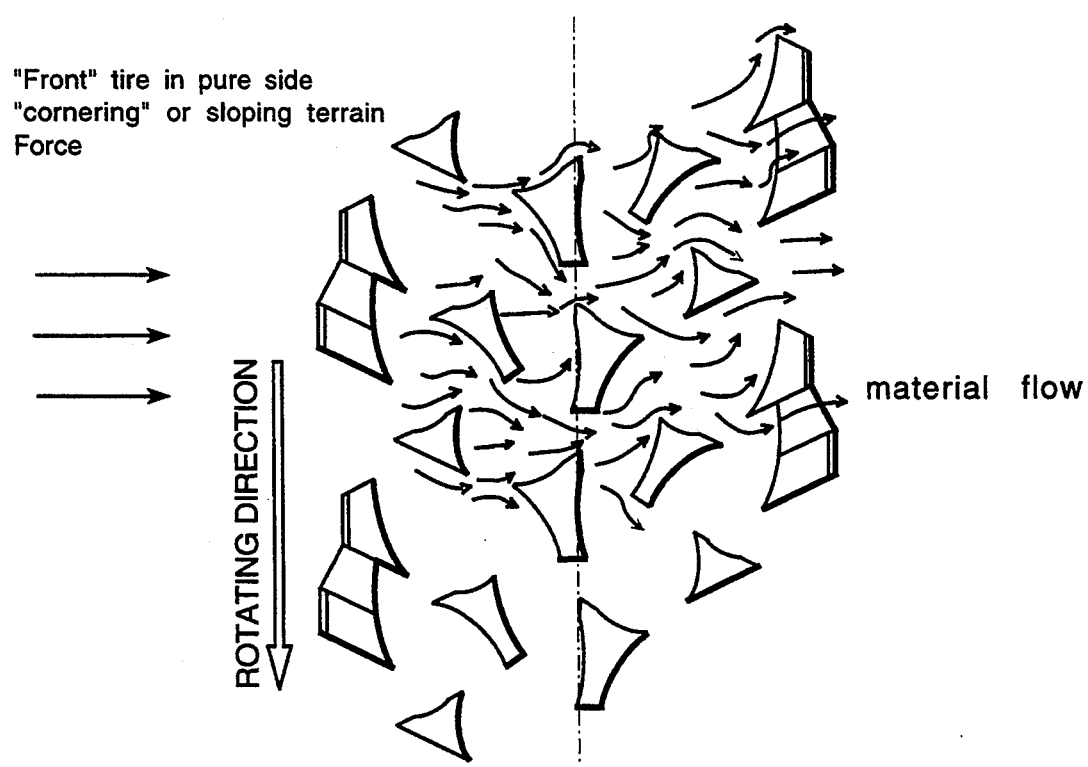
Figure 16:
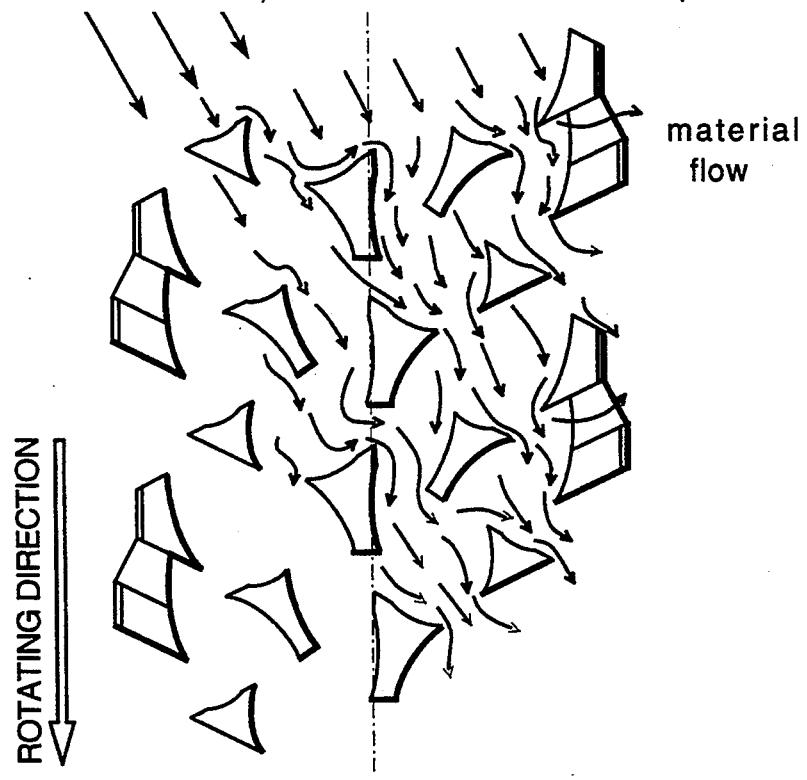
Figure 17:
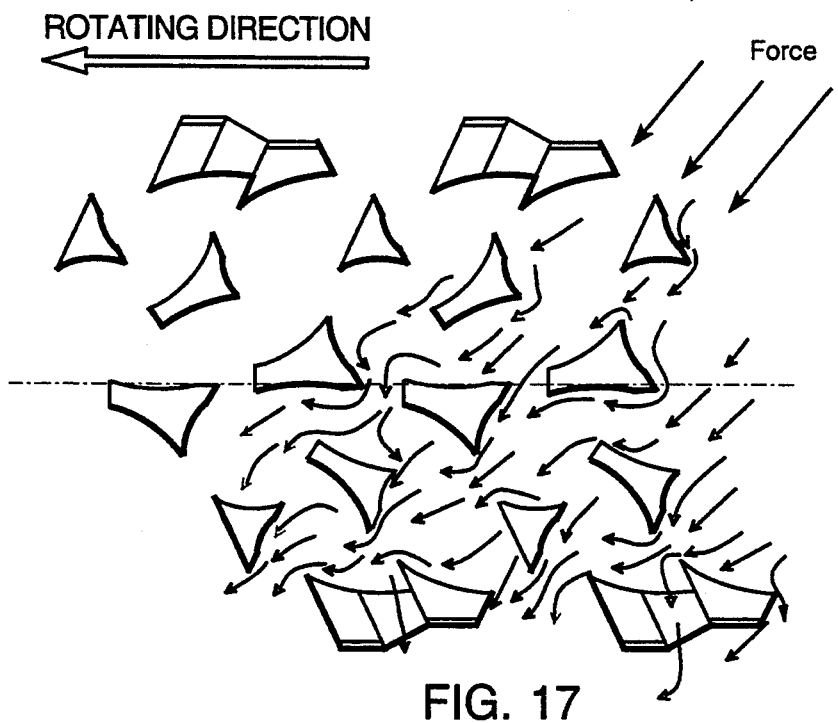
Figure 18:
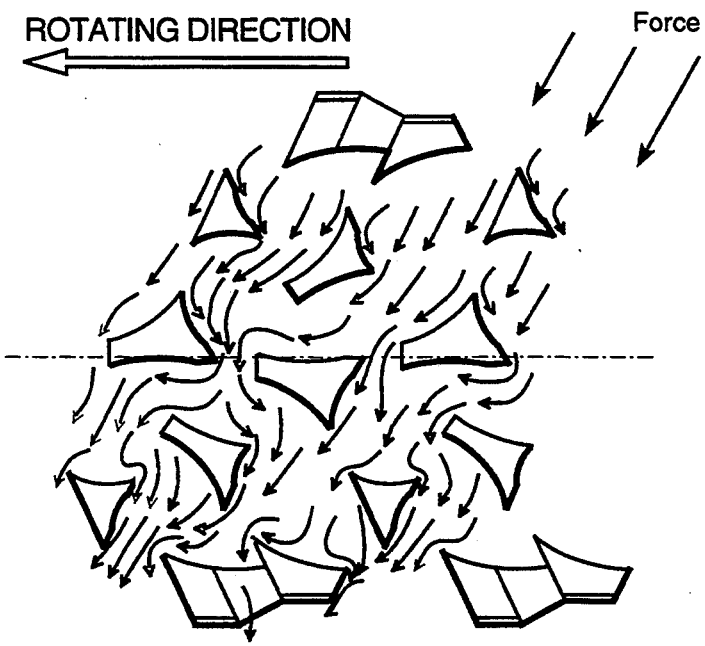
Figure 19:
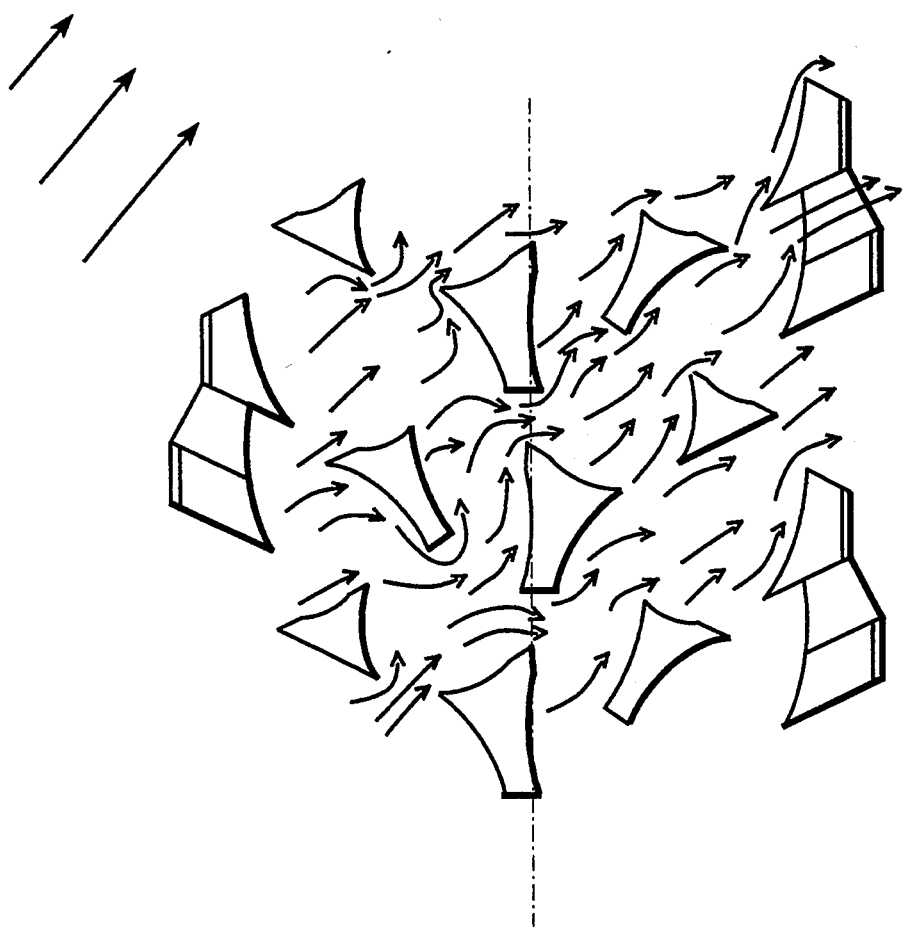

The above and other objects, advantages and features of the invention will become more apparent when considered with the following specification and accompanying drawings wherein:

FIG. 1 is a sectional view of a tire casing incorporated in the invention,

FIG. 2 illustrates the geometry of one embodiment of a tire tread pattern incorporating the invention, FIG. 3 is a sectional view through lines 3—3 of FIG. 2, FIG. 4 is a sectional view through lines 4—4 of FIG. 2, FIG. 5 is a sectional view through lines 5—5 of FIG. 2, FIG. 6 is a sectional view through lines 6—6 of FIG. 2, FIG. 7 is a sectional view through lines 7—7 of FIG. 2, FIG. 8 is a sectional view through lines 8—8 of FIG. 2, FIG. 9 is a sectional view through lines 9—9 of FIG. 2, FIG. 10 is a sectional view through lines 10—10 of FIG. 2, FIG. 11a and 11b are details of the tread and casing junctions, FIG. 12 illustrates exemplary tread block dimensions of FIG. 9, FIG. 13 indicates directions of material (moderate) flow for the tire tread shown in FIG. 2 with a straight braking force (or the rear in straight motive force reversed rotating direction, FIG. 14 indicates directions of material flow for the tire tread shown in FIG. 2 used in the rear reversed rotating direction and straight braking force, FIG. 15 indicates directions of material flow in a substantially "pure" side cornering or sloping terrain force, FIG. 16 indicates directions of material flow for the tire shown in FIG. 2 used on a front wheel in braking on medium side slope or during cornering or used in the rear (direction of rotation reversed) motive force on medium side slope or during cornering, FIG. 17 indicates directions of material flow for the tire shown in FIG. 2 used on a front tire in braking on medium side slope or used in the rear (direction of rotation reversed) motive, FIG. 18 indicates the directions of material flow for tire tread shown in FIG. 2 used as a front tire in light braking on a steep side slope or hard cornering used in the rear (direction of rotation reversed) light motive force on steep side slope or during hard cornering, FIG. 19 indicates the directions of material flow for the tire tread shown in FIG. 2 used as a rear tire (direction reversed) under braking and cornering on medium side slope forces.

DETAILED DESCRIPTION OF THE INVENTION

FIG. 1 is a sectional view of a tire casing with an optional inner tube inflated to a predetermined air pressure. The casing C is comprised of casing threads T initially held in assembly by stitching (not shown). The casing C is folded about wire beads WB (which may be high tensile strength non-metallic material such as Kevlor or steel) and lapped so that the casing sidewalls have two layers of fabric and the portions under the treads per se have three layers of fabric. The fabric is impregnated with a rubber compound and, in the preferred embodiment, the casing is a single sheet of unidirectional fibers (uniply) stitched together and folded as described above.

FIGS. 2-12 show the geometry and tread pattern for a 26×2.1 "front" tire (with exemplary dimensions), and FIGS. 13-17 show the geometry and tread pattern for a 26×2.1 "rear" tire (with exemplary dimensions). While both patterns can be used as front or rear tires, the embodiment of FIG. 2 is preferred when the tire is used as both the front and the rear tire.

According to this invention, as described above, the preferred configuration "front" and "rear" bicycle tires have in common a casing composed of a folded layer of lightweight, high strength rubber impregnated nylon fabric with a thread count counted perpendicular to the thread direction of about 120 threads per inch, but which could range as low as 60 threads per inch on a bicycle tire, up to as high as 300 threads per inch on a bicycle tire, or as low as 20 threads per inch on a motorcycle tire, up to 120 threads per inch on a motorcycle tire. The fabric material could be composed of nylon, polyester, cotton, Kevlar™, Spectra™, or other high strength supple fiber material or combinations of such materials. The objective is to use as high a thread count as possible (which implies using very fine thread) while maintaining adequate strength. The preferred configuration has a thin layer of rubber tread compound on the exterior surface of the casing supporting the tread blocks of about 1 mm or less on a bicycle tire, but which could range up to 3 to 4 mm on a bicycle tire, and up to as thick as 8 mm on a motorcycle tire. The objective is to have as thin a layer as possible so as to reduce hysteresis as the casing flexes and to keep the casing as supple as possible in order to conform readily to uneven terrain, while providing adequate protection to the casing from wear, tear and puncture. The casing when mounted on an appropriate rim with an inner tube, if appropriate, and inflated to 50 pounds per square inch internal pressure having a casing width (CW) measured at the widest point of the casing perpendicular to the plane of the tire. The casing width (CW) is typically between 45 and 52 mm for the preferred configuration in a "26 inch" bicycle tire, or about 40 mm for the preferred configuration in a "700 C" bicycle tire. The casing width could be as small as 18 mm to as large as 55 mm on a standard bicycle, and could even go as high as 100 mm on a tire for a specially built bicycle with larger tire clearance than normal. A motorcycle tire could have a casing width CW as low as 2.5 inches up to as high as 10 inches, but the preferred configuration would be 4 to 5.5 inches.

The tread blocks according to this invention have a crisp or sharp edge between the top or ground contact surface of the tread block and the sides of the tread block. The forward surface or side of the tread block is defined as that part of the tread block which when said tread block being in contact with the ground, faces in the same direction as the forward travel direction of the cycle or vehicle.

The "front" tire has a center tread A, see FIG. 2, an intermediate tread block B, another intermediate tread block C, and a side tread block D. Each type or shape of tread block is located on the left and right sides of the tire and the shapes on the left and right sides, respectively, are mirror images of each other.

The right hand tread block A has a forward facing side. The forward side is at an angle of 105 to 135 degrees clockwise tip to tip from the centerline of the tire. The preferred embodiment or configuration uses an angle of about 119 degrees. The said forward side or face is a plane or a shallow concave surface or a combination of the two of a total length approximately 0.16 times the dimension of the casing width (CW). The preferred configuration has a linear part of length about 0.04 times CW on the left side and a shallow concave part with a radius of about 0.17 times CW of a length of about 0.12 times CW on the right side. The linear section and the tips of the concave section lie about on a straight line.

The right hand tread block A has a left side the forward end of which is connected to the left end of said front side. The left side is at an angle from the tire centerline of between clockwise 30 degrees and counterclockwise 5 degrees tip to tip. The preferred embodiment is 8 degrees clockwise from the tire centerline. The said left side is composed of a plane or a shallow concave surface or a combination of the two with a total length of about 0.21 times the casing width CW. The preferred embodiment is composed mainly of a large concave radius of about 0.25 times CW.

The right hand tread block A has a right side at an angle of 20 to 50 degrees clockwise tip to tip from the tire centerline connected at its forward end to the right end of the forward side. The preferred embodiment uses an angle from the tire centerline of 34.5 degrees. The said right side is composed of a plane or a shallow concave surface or a combination of the two with a total length of about 0.17 times CW. The preferred embodiment uses a large concave radius of about 0.29 times CW.

The right hand tread block A has a rear side connected at its left end with the rear end of the said left side. The said rear side is connected at its right end with the rear end of said right side. In the preferred embodiment the rear side is a linear section.

The right hand tread block A has a height of about 0.09 times CW in the preferred embodiment, but could vary from 0.05 times CW up to 0.16 times CW above the thin rubber layer covering the casing.

The right hand tread block A in the preferred embodiment where the forward end of the left side of tread block A is close to or on the centerline of the tire.

In the preferred embodiment, the right hand tread block A is positioned around the circumference of the tire in combination with other tread blocks in a repeating pattern alternated with mirror images of itself about the tire centerline, with a spacing between the most forward portion of the right hand tread block A and the most rear portion of the next left hand tread block A forward of it being about 0.12 times CW. This spacing could vary from 0.08 times CW to up to 0.21 times CW.

The right hand tread block A in the preferred embodiment has a larger base surface area where it is joined to the thin rubber layer on the casing surface than at the top or ground contact surface, with sides that taper apart from the top edges at approximately 10 degrees and are joined to the thin base layer with a smooth radius of about 0.02 times CW, except for said right side of tread block A which blends into the base with a larger radius of about 0.07 times CW to provide additional support against expected side loadings predominantly in that direction.

The right hand tread block B is positioned to the right side of the tire centerline. The forward right side of the tread block also faces away from the center line of the tire and is between 105 and 135 degrees clockwise tip to tip from the centerline of the tire. In the preferred embodiment the angle is 120 degrees. The said forward side is a flat surface, shallow concave surface, or a combination of the two of a total length of about 0.17 times CW. In the preferred embodiment there is a center concave surface of radius 0.15 times CW and length 0.1 times CW, with short linear segments on either end of length 0.035 times CW lying approximately on a line from tip to tip.

The right hand tread block B has a rear side also facing to the right, connected at its right end with the right end of the said forward right side. The rear side of tread block B is at an angle of 50 to 80 degrees clockwise tip to tip from the centerline of the tire, or about 65 degrees in the preferred embodiment. The said rear side is composed of a flat plane, shallow concave surface, or combination of the two, with a total length of about 0.19 times CW. In the preferred embodiment the rear right side is flat or linear.

The right hand tread block B has a left side, the rear end of which is connected to the left end of the right rear side, the forward end of left side is connected with the left end of the forward right side. The left side surface is composed of a flat plane, shallow concave surface or a combination of the two. In the preferred embodiment, it is a concave arc of radius 0.19 times CW.

The right hand tread block B has a height of about 0.08 times CW in the preferred embodiment, but could vary from 0.04 times CW up to 0.15 times CW above the said thin rubber layer covering the casing.

The right hand tread block B in the preferred embodiment is positioned on the tire such that the most forward point of tread block B is a distance of about 0.24 times the width of the tire casing CW to the right from the centerline of the tire.

The right hand tread block B is positioned around the circumference of the tire in combination with other tread blocks in a repeating pattern alternated with mirror images of itself about the tire centerline, with a spacing between the most forward portion of the right hand tread block B and the most rear portion of the next right hand tread block B in front of it being about 0.5 times CW in the preferred embodiment.

The right hand tread block B in the preferred embodiment has a larger base surface area where it is joined to the thin rubber layer on the casing surface than at the top or ground contact surface, with sides that taper apart from the top edges at approximately 10 degrees and are joined to the thin base layer with a smooth radius of about 0.02 times CW, with the exception that the rear face of the tread block B is joined to the thin base layer with about a 10 degree taper but with a larger smooth radius of about 0.07 times CW.

The right hand tread block C is on the right side of the tire centerline. Tread block C is composed of a forward side facing partly to the right at an angle of about clockwise 100 to 130 degrees tip to tip from the centerline of the tire, or about 113.5 degrees in the preferred embodiment. The said forward side or surface is composed of a flat plane, shallow concave surface or a combination of the two of a total length of about 0.11 times CW. In the preferred embodiment the right part of the forward surface is linear of length about 0.035 times CW, and lies about in a line with the two ends of the forward side. The left part of the forward surface is composed of a concave arc of radius about 0.15 times CW.

The right hand tread block C has a right side which is facing partially to the rear, connected to the right rear end of said forward side at said right side's forward right end, at an angle from the tire centerline of clockwise 35 to 60 degrees tip to tip, or about 48 degrees for the preferred embodiment. The said right rear surface is composed of a flat plane, shallow concave surface, or a combination of the two of a total length of about 0.18 times CW. In the preferred embodiment, the right rear surface is a concave arc of radius 0.29 times CW.

The right hand tread block C has a left side also facing partly forward, at an angle of about 10 to 35 degrees clockwise tip to tip from the centerline of the tire, or about 26 degrees in the preferred embodiment. The left side is connected at its forward end to the left end of said forward surface. The said left side is composed of a flat plane, shallow concave surface or a combination of both of a total length of about 0.15 times CW. In the preferred embodiment, the left side is a concave arc of radius about 0.29 times CW.

The right hand tread block C has a rear surface connected on its right end with the rear end of said right surface, and connected on its left end with the rear end of said left surface.

The right hand tread block C has a height of about 0.09 times CW in the preferred embodiment, but could vary from 0.05 times CW up to 0.16 times CW above the said thin rubber layer covering the casing.

The most forward point of right hand tread block C, the intersection of the said forward side and said left side, is a distance of about 0.16 times the width of the tire casing CW to the right from the centerline of the tire in the preferred embodiment.

The tread block C is positioned around the circumference of the tire in combination with other tread blocks in a repeating pattern alternated with mirror images of itself about the tire centerline, with a spacing between the most forward portion of the right hand tread block C and the most rear portion of the next right hand tread block C in front of it being about 0.5 times CW in the preferred embodiment.

Right hand tread block C in the preferred embodiment has a larger base surface area where it is joined to the thin rubber layer on the casing surface than at the top or ground contact surface, with sides that taper apart from the top edges at approximately 10 degrees and are joined to the thin base layer with a smooth radius of about 0.02 times CW, with the exceptions that the said rear face of the tread block C is joined to the thin base layer with about a 10 degree taper but with a larger smooth radius of about 0.07 times CW and the said right side of tread block C is joined to the base with a radius of about 0.09 times CW.

Tread block D is a double on the right side of the tire centerline. Tread block D is composed of a forward and a rear tread sections. The forward side of the forward section is at an angle of about 105 to 135 degrees clockwise tip to tip from the centerline of the tire, or 120 degrees for the preferred embodiment. The said forward side or surface is composed of a flat plane, shallow concave surface or a combination of the two of a total length of about 0.07 times CW. In the preferred embodiment the said forward side is composed of a linear surface.

Right hand double tread block D has a left side of the forward tread section which is facing partially forward, connected to the left end of said forward side at said left side's forward end. The said left side is positioned at an angle from the tire centerline of clockwise 0 to 30 degrees tip to tip, or 15.5 degrees in the preferred embodiment. The said left surface of the forward section is composed of a flat plane, shallow concave surface, or a combination of the two of a total length of about 0.2 times CW. In the preferred embodiment the left side is composed of a concave arc of radius 0.29 times CW.

Right hand double tread block D has a rear side of the forward tread section facing partly to the right, at an angle of about clockwise 45 to 75 degrees tip to tip from the centerline of the tire, or 59 degrees in the preferred embodiment. The said rear side is connected at its left end to the rear end of said left surface. The said rear side is composed of a flat plane, shallow concave surface or a combination of both of a total length of about 0.13 times CW. In the preferred embodiment the rear side is a linear surface.

Right hand double tread block D has a right surface connected on its forward end with the right end of said forward surface, and connected on its rear end with the right end of said rear surface, Right hand double tread block D has a forward side of the rear section of double tread block D at an angle from the center line of the tire clockwise of 45 to 75 degrees tip to tip or 59 degrees in the preferred embodiment. The said forward side is composed of a flat plane, shallow concave surface or a combination of both of a total length of about 0.09 times CW. In the preferred embodiment the said forward side is linear.

Right hand double tread block D has a left side of the rear tread section which is connected to the left end of said forward side at said left side's forward end, at an angle from the tire centerline of counter-clockwise 10 to clockwise 20 degrees tip to tip, or about 5 degrees in the preferred embodiment. The said left surface of the rear section is composed of a flat plane, shallow concave surface, or a combination of the two of a total length of about 0.12 times CW. In the preferred embodiment the left surface is composed of a concave arc of radius 0.29 times CW.

Right hand double tread block D has a rear side of the rear tread section facing partly to the right, at an angle of about clockwise 45 to 75 degrees tip to tip from the centerline of the tire, or about 59 degrees in the preferred embodiment. The said rear side is connected at its left end to the rear end of said left surface, said rear side being composed of a flat plane, shallow concave surface or a combination of both of a total length of about 0.13 times CW. In the preferred embodiment the rear side is planar or linear.

Right hand double tread block D has a right surface connected on its forward end with the right end of said forward surface, and connected on its rear end with the right end of said rear surface.

In the preferred embodiment, the said forward and rear sections of right hand double tread block D are separated between their respective rear and forward sides by a groove of about 0.1 times CW in width, said groove having a depth of about 0.5 times the total tread depth of double tread block D, said forward and rear sections of tread block D being connected at their respective bases below the said groove.

Right hand double tread block D has a height of about 0.11 times CW in the preferred embodiment, but could vary from 0.06 times CW up to 0.2 times CW above the said thin rubber layer covering the casing.

In the preferred embodiment, the most forward point of double tread block D, the intersection of the said forward side and said left side of said forward section, is a distance of about 0.42 times the width of the tire casing CW to the right from the centerline of the tire.

The right hand double tread block D is positioned around the circumference of the tire in combination with other tread blocks in a repeating pattern alternated with mirror images of itself about the tire centerline, with a spacing between the most forward portion of the right hand tread block D and the most rear portion of the next right hand tread block D in front of it being about 0.3 times CW in the preferred embodiment.

In the preferred embodiment, the right hand double tread block D has a larger base surface area where it is joined to the thin rubber layer on the casing surface than at the top or ground contact surface, the top half of the right side of both said sections of the said tread block has 0 degree taper from the top of the tread block for about half of the distance from the top of the tread to the thin rubber layer on the casing, the lower half of the right side of both sections tapering at about a 30 degree angle with a smooth radius blend into the thin casing layer of radius about 0.04 times CW, the forward side of the forward section and the rear side of the rear section of double tread block D tapering from the top at an angle of about 10 degrees, blending into the thin rubber layer at the casing with a smooth radius of about 0.07 times CW, the right sides of both sections of the double tread block D tapering from the top at about 30 degrees from perpendicular with the top surface.

In the preferred embodiment, the distance to the rear from the most rear point of right tread block D to the most front point of the next right tread block B is about 0.07 times CW for the "front" tire.

In the preferred embodiment, the most forward point of right tread block C, the intersection of the said forward side and said left side, is a distance of about 0.16 times CW to the right from the centerline of the tire and said most forward point of said tread block C is about 0.25 times CW to the rear of the most rear point of the next right tread block B forward of said right tread block C for the "front" tire.

In the preferred embodiment, the most forward point of right tread block A is about even with the most rear point of the next right tread block B forward of said tread block A for the "front" tire, see FIG. 2.

In the preferred embodiment, the tread block pattern on the left side of the tire is a mirror image of the tread block pattern described on the right side of the tire, but rotated or offset a distance of about 0.33 times CW around the circumference of the tire in order to interleave the two tread patterns. The left tread block A is about centered between the two nearest right tread blocks A on the "front" tire, see FIG. 2, and the left tread block E is about centered between the two nearest right tread blocks E on the "rear" tire, see FIG. 2.

The "rear" tire shown in FIGS. 13-17 has a right hand center tread block E, an intermediate tread block B, and a double side tread block D. The tread blocks B and D are the same shape as the tread blocks B and D on the "front" tire, but they are located differently on the "rear" tire. The two circumferential rings of elongated side tread blocks D have the two intermediate rings of triangularly-shaped tread blocks B interposed in the spaces between successive elongated side tread blocks D for both tread patterns.

The "rear" tire has a right tread block E with a left forward side at an angle of 80 to 100 degrees from the center line of the tire, or 90 degrees in the preferred embodiment. The said left forward side has a length of about 0.06 times the casing width CW, a forward left side at an angle of 45 to 65 degrees counter-clockwise from the tire centerline, or about 55 degrees in the preferred embodiment, connected at the forward end to the left end of said left forward side of a length about 0.13 times CW, a rear left side at an angle of 45 to 65 degrees clockwise from the tire centerline, or about 55 degrees in the preferred embodiment, of a length of about 0.17 times CW, its forward end being connected to the rear end of the forward left side with a radius of about 0.02 times CW, a left rear side at an angle of 80 to 100 degrees from the centerline of the tire, or about 90 degrees in the preferred embodiment, with a length of about 0.11 times CW, its left end being connected to the rear end of said rear left side, a center rear side connected at its left end to the right end of said left rear side, said center side curving forward in a concave shape, of radius about 0.19 times CW in the preferred embodiment, from the said left end of the center rear side at an angle of 45 to 65 degrees clockwise from the centerline of the tire, or about 55 degrees in the preferred embodiment, and ending at an angle of 45 to 65 degrees counter-clockwise from the centerline of the tire, or about 55 degrees in the preferred embodiment, with a length tip to tip of about 0.24 times CW, a right rear side connected at its left end to the right end of said center rear side, at an angle of 80 to 100 degrees from the centerline of the tire, or about 90 degrees in the preferred embodiment, with a length of about 0.06 times the casing width CW, a rear right side at an angle of 45 to 65 degrees counter-clockwise from the tire centerline, or about 55 degrees in the preferred embodiment, connected at the rear end to the right end of said right rear side of a length about 0.13 times CW, a forward right side at an angle of 45 to 65 degrees clockwise from the tire centerline, or about 55 degrees in the preferred embodiment, of a length of about 0.17 times CW, its rear end being connected to the forward end of the rear right side with a radius of about 0.02 times CW, a right forward side at an angle of 80 to 100 degrees from the centerline of the tire, or about 90 degrees in the preferred embodiment, with a length of about 0.11 times CW, its right end being connected to the forward end of said forward right side, a center forward side connected at its right end to the left end of said right forward side, said center side curving to the rear in a concave shape of radius about 0.02 times CW in the preferred embodiment, from the said right end of the center rear side at an angle of 45 to 65 degrees clockwise from the centerline of the tire, or about 55 degrees in the preferred embodiment, and ending at an angle of 45 to 65 degrees counter-clockwise from the centerline of the tire, or about 55 degrees in the preferred embodiment, with a length tip to tip of about 0.24 times CW, and connected at its left end with the right end of the said left forward side, a groove in the top of the tread block E starting approximately at the center of the center forward side and ending in the rear part of the forward left side with a depth of about half of the total tread block depth and a width of about 0.03 times CW, a second groove in the top of the tread block E starting approximately at the center of the center rear side and ending in the forward part of the rear right side with a depth of about half of the tread block depth and a width of about 0.03 times CW.

The tread block E has a tread depth of about 0.09 times CW in the preferred embodiment, but which could range from 0.05 times CW to 0.16 times CW.

In the preferred embodiment, the right hand tread block E is positioned so that the said right forward side intersection with the said forward right side is a distance of about 0.28 times the width of the tire casing CW to the right of the centerline of the tire, and about 0.1 times CW to the rear of the most forward point of the nearest right tread block D.

The right hand tread block E is positioned around the circumference of the tire in combination with other tread blocks in a repeating pattern alternated with mirror images of itself about the tire centerline, with a spacing between the most forward portion of the right hand tread block E and the most rear portion of the next left hand tread block E in front of it being about 0.14 times CW in the preferred embodiment, but which could range from 0.08 times CW to 0.2 times CW.

The said tread block E has a larger base surface area where it is joined to the thin rubber layer on the casing surface than at the top or ground contact surface, with sides that taper apart from the top edges at approximately 10 degrees in the preferred embodiment and are joined to the thin base layer with a smooth radius of about 0.02 times CW in the preferred embodiment.

The said tread block D in the preferred embodiment "rear" tire has the same interval spacing and distance from the tire centerline, but is located differently with respect to tread blocks B and E.

In the preferred embodiment, the distance to the rear from the most rear point of right tread block D to the most front point of the next right tread block B is about 0.02 times CW for the "rear" tire.

The "front" tire in the preferred embodiment can have a small clearance angle built into the ground contact faces of the tread blocks. The purpose is to allow the biting edge to penetrate the ground material more easily, giving improved traction. On the "front" tire, tread block A would be slightly lower at its rear edge, for improved braking traction. On the "front" tire, tread blocks B, C and D would be slightly lower on their respective edges away from the tire centerline and to the rear in order to improve braking and cornering traction.

In high traction ground conditions, a high quality supple sticky rubber compound will provide excellent traction even with a smooth (tread-less) tire. The goal in a high traction condition is to have tread blocks which distribute the load evenly and smoothly, and which do not deform excessively in the direction of load, in order to maintain even traction and low rolling resistance. The invention does this in several ways:

First, the tread blocks on the "front" tire are positioned so as to have their major axis aligned predominantly with the direction of motion, not transverse to it, so tread block deflection under motive and braking forces is reduced.

Second, the tread side surfaces taper to the base, providing more support for the tread top surface than the typical straight sided block. Also, the tapered side surfaces are more self cleaning than straight sided tread blocks. Dirt or mud does not cling to the tapered surface as tenaciously, and as the tire contacts the ground and works against it, the tapered surface is often wiped clean. Where the tread blocks see a loading in predominantly one direction, the amount of taper is increased on the side or sides necessary to back up the ground contact surface of the tread block and help support it against the predominant force and to reduce its deflection in that direction. Another feature of the tapered side blocks is that the actual surface area contacting the ground is reduced, resulting in a tread block with high penetrating ability in soft soil conditions, with the advantage of improved traction.

Third, the tapered side surfaces are radiused into the casing layer, for even more support of the blocks. See FIGS. 11a and 11b. Also the radius at the contact with the casing does not provide a nook or crevice for dirt or mud to cling into, thus helping to keep the tire cleaner than a tire where the tread shoot straight into the casing with a sharp inside corner. Again, where the tread blocks see a loading in predominantly one direction, the blending radius is increased on the side or sides necessary to back up the tread block and help support it against the predominant force and to reduce its deflection in that direction.

Fourth, the tread blocks are spaced and located so that there is a more continuous engagement than in many tires. This is more evident on the "front" design.

Fifth, the height of the tread blocks in the center section is relatively low compared to some tires, which reduces the tread block deflection considerably.

Sixth, the tread compound is a supple rubber with high adhesion and low rolling resistance properties.

Seventh, the height of the side tread blocks above the tire casing is larger than those in the center. The center blocks are relatively low, and the side blocks are noticeably higher, providing a slightly "flat top" appearance. This increases the width of tread actually contacting the surface and effectively spreads out the load among more tread blocks and a larger surface area of the tire casing to improve traction and reduce rolling resistance, compensating for the reduced tread contact area density of the invention.

For off-angle or cornering traction on high traction surfaces, many of the same factors apply. Here the typical tire has some narrow blocks sticking out from the side of the tire, oriented longitudinally with the rotation direction. In a moderate lean angle, part of the center tread is still in contact with the ground as well as the intermediate and side tread blocks. On the high traction surface, this works very well as the load is still spread among several blocks. On a sharp lean angle, however, which is very possible on a high traction surface, the load is shifted predominately over to the intermediate and side blocks, and these typically narrow blocks are not oriented so as to resist such high forces. The blocks deform extremely and "fold over". Even though it is on a high traction surface, the tire with laterally weak side blocks will slip at a high side load angle.

The invention handles the high side load forces generated on a high traction surface by incorporating unique features into the tread blocks.

Two side tread blocks D are linked. The top surfaces of these blocks are not larger than a typical tire side block, but they are very well supported. The outside edge of these blocks extends down the side of the tire a considerable distance to support it against a high side load. The inside edge also is well supported. The inside surface starts down from the top edge perpendicular to the tread top surface for a high grip edge effect but halfway to the base layer it flares out 30 degrees and then blends smoothly into the base rubber layer with a nice radius. In addition to the inside and outside support, the forward edge of the front block is supported with an angled face of about 10 degrees and a large smooth radius into the base layer, the rear face of the rear block is similarly supported, and the two blocks are linked at the base with a radiused groove about half the depth of the overall tread blocks. The groove is deep enough and wide enough such that mud will pass through to clean the double tread block, but the connection is substantial enough to help support the tread block pair against high side loads. Another factor aiding the side support is the spacing and orientation of the paired blocks. The forward block is set closer to the center of the tire than the rear block. This helps to stiffen the paired block to the side loads.

The basically triangular tread B on both tires is oriented to give a real good bite in side loading, but is also much better braced to resist side forces than a typical intermediate or side block of existing tires. The relatively large lateral width of the block contributes to its lateral stiffness as does its tapered sides and radiused junctions with the base layer. In addition it incorporates a large radius blend on the rear side facing away from the center of the tire to further stabilize it from forward and side loads on the "front" tire.

The intermediate tread C on the front tire also will work to advantage on a high angle as although it is a relatively narrow tread section, it is oriented diagonally to the side force and the side facing away from the center of the tire and to the rear has a very large radius blend to support this tread well against large side and forward loads.

In loose materials, the tread has to function differently. Here a smooth no tread design will tend to shear the loose surface material, providing reduced traction. The tread needs to dig into the loose material and achieve a bite, preferably it will dig through the loose material to achieve contact with a solid surface underneath. Many current prior art tread designs use a sharp edge perpendicular to the direction of force. This is effective in many conditions, but as it does not allow for the escape of loose material that it digs into, it can just plow it ahead until the effect is just like dirt slipping on dirt. Many tires on the market are prone to this in the fore and aft directions as well as in the side (cornering) directions. The invention approaches this problem more like a road grader. The cutting edges are generally arranged so that the loose or wet material is "graded" or "bulldozed" off to the side leaving the tread block clean to continue gripping. In the case of the forward or backward force directions, each block of the front tire plows the mud or dirt away from the center of the tire, effectively cleaning not only the individual tread blocks, but the whole tire contact patch as well. In the case of the rear tire, the X tread E has considerable space around itself for the mud or dirt to clean but does not plow it off to the side when slipping in the forward or backward direction. The rear tire is more tuned to the harder, dryer conditions with maximum motive traction. The front tire will work very well on the rear wheel in soft or muddy conditions if the direction of rotation is reversed, or even if it is not, as the angles of the sides of the tread blocks on the front tire are positioned such that and the tread blocks are positioned relative to each other such that mud will be bulldozed or squeegeed to the outside of the tire with either a forward or rear slip direction. Thus when used as a rear tire, the rider will enjoy both a high level of motive traction and excellent braking and cornering. Most tires available cannot provide this.

In use, the front tire will not just see front or side forces, but a combination of these types of force. Riders brake into corners, sharp corners will apply a high drag moment on the front tire inherently, riders will use their brakes while traversing on a side slope, etc. That is why the preferred configuration front tire does not use a single shape of block or edge, with the same orientation. Most tires have the tread blocks arranged in some type of rows, which in mud tend to load up the narrow spaces between the blocks with mud and then act like the skis mentioned earlier. The "farmer" series of tires and clones did not realize that the typical tractor rear tire is not called upon to develop high side forces, or that actual tractor tires have a large amount of space between the treads and have very deep treads to clean mud and dig down to firmer ground. The "farmer" series of bicycle tires are very poor in maintaining side grip in slippery conditions. The tire simply slips along the "fault" lines.

There are no rows of closely spaced tread blocks on the invention. There is a complete lack of a suitable slip plane or angle on the front tire and the rear tire has high clearance between its tread blocks to greatly reduce the probability of loading.

An important key distinguishing feature of the invention over prior art is the mechanism for creating grip in all conditions and at all angles of applied force. What the invention creates is a tortuous path between the tread blocks for flow of loose or wet material, without excessively constricting or trapping the flow in any one spot. This would be similar to water flowing down stairs, it is slowed up by the repetitive changes in direction. The flow paths must be large enough to allow adequate flow of material, but should not be straight, smooth channels. If the constrictions are too tight or the path too narrow or overly convoluted, the material will not flow through it but instead, begin to shear in the direction of force against the ground, and build up and stick to the surfaces of the tread and tire casing. The tread configurations also should not cause the flow to be reversed against the force direction. This again would tend to cause it to shear with the ground in the reversed region.

As shown in FIGS. 13 through 19, the "front" tire slip patterns in each direction of applied force allow ample material flow. The tread block surfaces work to clean themselves by the action of the loose or wet material sweeping by them. The ground material flow is typically redirected three or more times before leaving the contact area, providing a distributed resistance to the flow. This creates a high degree of traction or friction in the desired direction, regardless of the ground conditions. Most top rated tires provide grip in wet conditions only until they start to slip, after which the spaces between the tread blocks typically pack up with trapped mud and continue to slip very easily, much like a smooth tire. In the invention the effect of slip will be to clean the tread blocks and to clean the ground contact surface providing increased traction. The tread blocks are not as likely to trap and hold mud. The tread blocks are also arranged so that braking, cornering, motive traction and side slope forces and combinations of these will all tend to plow the mud or loose dirt out of the area of the tire contact patch and push this material to the sides. The center tread blocks A also provide excellent side load grip unlike the center tread block of most tires. The invention also provides a very high degree of traction in soft to hard dry conditions with multiple sharp edges of the tread blocks strategically placed to resist slippage in critical directions. Each tread block in the "front" tire is designed and spaced from other tread blocks so as to provide maximum self cleaning in any direction, as well as maximum grip in all expected directions in both hard to soft and wet to dry conditions.

The individual tread blocks are aligned such that their respective surfaces are at different angles from each other. For example, the forward facing surfaces of tread blocks A, B, C and D on the "front" tire are each at a slightly different angle from the tire center line partially so that there is not one direction of force applied to the traction surface which will cause all of the working tread blocks to push mud or dirt straight ahead, effectively trapping it. Also, the concave surfaces of the tread blocks tend to give a higher range of working angle for the tread surface, and also redirect the material flow more smoothly than a straight surface, more like the blades of a turbine.

Distinguishing Features 120 threads per inch tire casing (very fine, light, strong and supple) * used only by Ritchey (references are to prior art tire designs of others)

Kevlar bead, very strong and light (well known in the art)

very thin rubber layer over casing material (lightweight, supple) * (used by Ritchey)

No easy slip planes in tread design large clearance between tread blocks (per se well known in the art)

Also tread block surfaces are angled and spaced such that typical slip directions will self clean the inter-block spaces, mud or dirt should not jam them.

Tread blocks surface forms a larger radius surface than casing, i.e., tread is deeper on sides than in middle "flat top" design. (per se well known in the art)

Tread blocks have sharp edges and corners to cut into soft materials such as mud, and to conform to irregular surfaces. These create a self cleaning or squeegee effect. (per se well known in the art)

Tread block surface is a low percentage of tire casing surface, allowing high penetration in soft materials, and providing the clearance between tread blocks discussed earlier. (used by Fisher, Porcupine, Smoke)

Tread block ground contact patch is large because of "flat top" tread shape (Smoke, Quad, Force)

No sharp inside corners or edges on tire to trap and hold dirt or mud. Tread blocks are angled downward and radiused into the casing for self cleaning and support of the block under load and under side forces. Specific tread blocks are angled severely in a particular direction to resist specific forces, yet allow high penetration into soft materials due to their small percentage of contact area spread out over a relatively large tire surface Deep tread blocks toward the edges allow higher penetration for exceptional cornering traction.

Relatively shallow tread blocks in center reduce deflection and thus lower rolling resistance. Flatter top shape spreads out braking and traction loads to improve overall performance.

Special side tread blocks have a small double block shape at the tread surface to effect high penetration and efficient cleaning of mud, with high grip, but are split for only a short distance. They are joined at the base to improve support on harder surfaces. When cornering on rock, or climbing off angle, most tire side knobs simply fold over, causing the tire to slip. They are not well enough supported on the sides. In contrast, this invention combines relatively small, tall tread with a high degree of support, including the angled and radiused base for superior mud and rock or dry conditions performance.

The tread blocks are arranged predominately with the direction of tire travel, and have a degree of overlap, to promote a smooth shift of load from one tread to another on a relatively flat surface with a minimum of casing hysteresis. This appears to lower the rolling resistance over the typical tread patterns which have a distinct gap between each tread block hitting the ground. In contrast, a typical tire sounds like a logging truck on pavement. (Ritchey et al.)

Each tread block was analyzed for it's position on the casing, and the angle of contact and the different directions of force that it will see in service. The specific angles and lengths of each block are designed to present a good bite into the ground surface, with a relatively small angle off of perpendicular to the direction of force, similar to a motor grader. The angle allows soft mud or other material which does not provide a firm grip to be pushed to the side, out of the way of the tread block, allowing the tread block to make positive contact with a good gripping surface. Both tires, and especially the front, have been highly optimized for side (cornering or off angle climbing) traction. When the bike is leaned over in a cornering condition, effectively only the tread on one side are being used. It is thus possible under this invention to optimize the tread on each side for the particular range of forces that it would see, and yet give it an excellent self cleaning action.

It is important that each tread block in solid contact with the ground be oriented and designed such as to provide maximum grip in the direction of force. Many tires perform well in the straight direction (motive traction or braking), but under application of side force, their laterally oriented center tread blocks provide little grip and an easy side slip path. The preferred configuration not only gets side grip from the side tread blocks but also from the intermediate and center blocks as well. And unlike most tires, provides traction and braking force directions with the intermediate and edge blocks very successfully.

While a preferred embodiment of the invention has been disclosed, it is obvious that other modifications, embodiments and adaptations of the invention will be readily apparent to those skilled in the art.

What is claimed is:

1. In a light-weight, high performance, all-terrain tire for two-wheeled vehicles having a rubber impregnated fabric tire casing and a plurality of rows of discrete, rubber tread blocks molded thereon, said tire casing having two sidewall portions joined by a tread portion and means for securing said tire to a rim for inflation with air to a predetermined pressure, said tire having a centerline, the improvement wherein said plurality of rows of discrete tread blocks are arranged in circumferential rows, the tread blocks in the rows being overlapped a predetermined degree to permit a smooth shift of load from one block back to another with a minimum of casing hysteresis, and include a circumferentially extending linear array of elongated side tread blocks disposed to the lateral sides, respectively, of said tread portion, each said side tread block comprised of a first portion spaced toward said centerline and a second portion being spaced further from said centerline than said first portion and having outside edges which extends down the sidewall of said casing for a predetermined distance, and means forming a space laterally directed between said first and second portions, the side tread blocks on one side of said centerline being mirror images and circumferentially spaced relative to the side tread blocks on the other side of said centerline, said tire further including a circumferential row of a substantially triangularly-shaped tread blocks to each side of said centerline, respectively, and adjacent said rows of side tread blocks, respectively, and correspondingly circumferentially spaced.

2. The tire defined in claim 1 including a circumferential row of generally trapezoidally shaped tread blocks spaced between said rows of substantially triangularly-shaped blocks and said centerline, respectively.

3. The tire defined in claim 2 including a further circumferential row of generally trapezoidally-shaped tread blocks arranged along said centerline with the tread blocks of said further circumferential row, successive ones of said tread blocks in said further circumferential row having alternate angular orientations relative to said centerline and a preceding tread block in its circumferential row.

4. In a light-weight, high performance, all-terrain tire for two-wheeled vehicles having a rubber impregnated fabric tire casing and a plurality of rows of discrete, rubber tread blocks molded thereon, said tire casing having two sidewall portions joined by a tread portion and means for securing said tire to a rim for inflation with air to a predetermined pressure, said tire having a centerline, the improvement wherein said plurality of rows of discrete tread blocks are arranged in circumferential rows, the tread blocks in the rows being overlapped a predetermined degree to permit a smooth shift of load from one block back to another with a minimum of casing hysteresis, and include a circumferentially extending linear array of elongated side tread blocks disposed to the lateral sides, respectively, of said tread portion, each said side tread block comprised of a first portion spaced toward said centerline and a second portion being spaced further from said centerline than said first portion and having outside edges which extends down the sidewall of said casing for a predetermined distance, and means forming a space laterally directed between said first and second portions, the side tread blocks on one side of said centerline being mirror images and circumferentially spaced relative to the side tread blocks on the other side of said centerline, said tread blocks provide a low rotating mass, low rolling resistance, high cornering adhesion with high consistency across differing types of ground conditions, high motive and stopping traction and said tread blocks being shaped and spaced in said circumferential rows so that they are substantially self-cleaning such that mud, dirt, or rocks do not remain adhered to the tread surfaces or lodged in the spaces between tread blocks, and wherein when inflated to a predetermined tire pressure pounds per square inch internal pressure said casing has a width CW measured at the widest point of the casing perpendicular to the plane of the tire, said tread blocks having a relatively sharp edge between the ground contact surface of the tread block and the sides of the tread block, the forward surface or side of the tread block being defined as that part of the tread block which when said tread block being in contact with the ground, faces in the same direction as the forward travel direction of the cycle, with a right hand tread block A having a forward facing side, the said forward side being at an angle of 105 to 135 degrees clockwise tip to tip from the centerline of the tire, said forward side or face being a nonconvex surface having a total length approximately 0.16 times the dimension of the casing width CW, a left side, the forward end of which is connected to the left end of said front side, said left side being at an angle from the tire centerline of between clockwise 30 degrees and counter-clockwise 5 degrees tip to tip, said left side being a non-convex surface having a total length of about 0.21 times the casing width CW, a right side at an angle of 20 to 50 degrees clockwise tip to tip from the tire centerline connected at its forward end to the right end of the forward side, said right side being a non-convex surface having a total length of about 0.17 times CW, a rear side connected at its left end with the rear end of the said left side, said rear side connected at its right end with the rear end of said right side.

5. The invention as in claim 4 wherein said tread block A is positioned around the circumference of the tire in combination with other tread blocks in a repeating pattern alternated with mirror images of itself about the tire centerline, with a spacing between the most forward portion of the right-hand tread block A and the most rear portion of the next left-hand tread block A forward of said right-hand tread block being about 0.12 times the casing width CW.

6. The tire defined in claim 4 wherein said tire includes a right hand tread block B positioned to the right side of the tire centerline and inside of said elongated side blocks, the forward right side of the tread block B also faces away from the center line of the tire and is between 105 and 135 degrees clockwise tip to tip from the centerline of the tire, said forward side being a flat surface, shallow concave surface, or a combination of the two of a total length of about 0.17 times CW, a rear side also facing to the right, connected at its right end with the right end of the said forward edge, said rear edge is at an angle of 50 to 80 degrees clockwise tip to tip from the centerline of the tire, said rear face being a flat plane, shallow concave surface, or combination of the two, with a total length of about 0.19 times CW, with a left side, the rear end of which is connected to the left end of the right rear side, the forward end of said left side is connected with the left end of the forward right side, the left side surface being composed of a flat plane, shallow concave surface or a combination of the two.

7. The tire as defined in claim 6 wherein the said tread block B is positioned in one of said circumferential rows around the circumference of the tire in combination with tread blocks in other circumferential rows in a repeating pattern alternated with mirror images of itself about the tire centerline, with a spacing between the most forward portion of the right hand tread block B and the most rear portion of the next right hand tread block B in front of said right-hand tread block B being about 0.5 times CW.

8. The tire defined in claim 4 wherein said tire includes a right hand tread block C on the right side of the tire centerline, said tread block C being composed of a forward side facing partly to the right at an angle of about clockwise 100 to 130 degrees tip to tip from the centerline of the tire, said forward side surface being composed of a non-convex surface having a total length of about 0.11 times CW, a right side which is facing partially to the rear, connected to the right rear end of said forward side at said right side's forward right end, at an angle from the tire centerline of clockwise 35 to 60 degrees tip to tip, said right rear surface being composed of a flat plane, shallow concave surface, or a combination of the two of a total length of about 0.18 times CW; a left side also facing partly forward, at an angle of about 10 to 35 degrees clockwise tip to tip from the centerline of the tire, connected at its forward end to the left end of said forward surface, said left side being composed of a flat plane, shallow concave surface or a combination of both of a total length of about 0.15 times CW, a rear surface connected on its right end with the rear end of said right surface, and connected on its left end with the rear end of said left surface.

9. The all terrain tire defined in claim 4, said side tread blocks including: a right hand double tread block D on the right side of the tire centerline, said tread block being composed of a forward and a rear tread sections, the forward side of the forward section being at an angle of about 105 to 135 degrees clockwise tip to tip from the centerline of the tire, said forward side or surface being composed of a non-convex surface having of a total length of about 0.07 times CW, a left side of the forward tread section which is facing partially forward, connected to the left end of said forward side at said left side's forward end, at an angle from the tire centerline of clockwise 0 to 30 degrees tip to tip, said left surface of the forward section being composed of a non-convex surface having a total length of about 0.2 times CW, a rear side of the forward tread section facing partly to the right, at an angle of about clockwise 45 to 75 degrees tip to tip from the centerline of the tire, connected at its left end to the rear end of said left surface, said rear side being composed of a non-convex surface having a total length of about 0.13 times CW, a right surface connected on its forward end with the right end of said forward surface, and connected on its rear end with the right end of said rear surface, a forward side of the rear section of double tread block D at an angle from the center line of the tire clockwise of 45 to 75 degrees tip to tip, said forward side being composed of a non-convex surface having a total length of about 0.09 times CW, a left side of the rear tread section which is connected to the left end of said forward side at said left side's forward end, at an angle from the tire centerline of counter-clockwise 10 to clockwise 20 degrees tip to tip, said left surface of the rear section being composed of a non-convex surface having a total length of about 0.12 times CW, a rear side of the rear tread section facing partly to the right, at an angle of about clockwise 45 to 75 degrees tip to tip from the centerline of the tire, connected at its left end to the rear end of said left surface, said rear side being composed of a non-convex surface having a total length of about 0.13 times CW, a right surface connected on its forward end with the right end of said forward surface, and connected on its rear end with the right end of said rear surface, said forward and rear sections being separated between their respective rear and forward sides by a groove of about 0.1 times CW in width, said groove having a depth of about 0.5 times the total tread depth of double tread block D, said forward and rear sections of tread block D being connected at their respective bases below the said groove.

* * * * *

UNITED STATES PATENT AND TRADEMARK OFFICE
CERTIFICATE OF CORRECTION

PATENT NO. : 5,377,734

DATED : January 3, 1995

INVENTOR(S) : Gary G. Klein and Darrell W. Voss

It is certified that error appears in the above-indentified patent and that said Letters Patent is hereby corrected as shown below:

Column 14, Between lines 56 and 57, insert the following:

--In Fig. 2, the dimensional values in the disclosed embodiment are as follows:

| REFERENCE CHARACTER | DIMENSION (mm) |
|---|---|
| 2-1 | 1.90 |
| 2-2 | 6.97 |
| 2-3 | 8.53 |
| 2-4 | 11.00 |

| REFERENCE CHARACTER | DIMENSION (mm) |
|---|---|
| 2-5 | 12.50 |
| 2-6 | 13.98 |
| 2-7 | 19.29 |
| 2-8 | 20.00 |
| 2-9 | 21.50 |
| 2-10 | 24.50 |
| 2-11 | 26.71 |
| 2-12 | 3.99 |
| 2-13 | 8.09 |
| 2-14 | 12.42 |

UNITED STATES PATENT AND TRADEMARK OFFICE
CERTIFICATE OF CORRECTION

PATENT NO. : 5,377,734
DATED : January 3, 1995
INVENTOR(S) : GARY G. KLEIN and DARRELL W. VOSS It is certified that error appears in the above-indentified patent and that said Letters Patent is hereby corrected as shown below:

| | |
|---|---|
| 2-15 | 16.31 |
| 2-16 | 25.81 |
| 2-17 | 7.41 |
| 2-18 | 9.29 |
| 2-19 | 11.66 |
| 2-20 | 17.92 |
| 2-21 | 26.91 |
| 2-22 | 35.00 |
| 2-23 | 6.99 |

In Figure 3, the dimensional values and angular relationships are as follows:

| REFERENCE CHARACTER | DIMENSIONS (mm) |
|---|---|
| 3-1 | 2.0 |
| 3-2 | 11.50 |
| 3-3 | 0.72 |
| 3-4 | 2.25 |
| 3-5 | 6.11 |
| 3-6 | 7.44 |
| 3-7 | 8.03 |
| 3-8 | 3.5 |
| 3-9 | 9.23 |
| 3-10 | R60.24 |
| 3-11 | R43.0 |
| 3-12 | 50.0 |

UNITED STATES PATENT AND TRADEMARK OFFICE
CERTIFICATE OF CORRECTION

PATENT NO. : 5,377,734

DATED : January 3, 1995

INVENTOR(S) : GARY G. KLEIN and DARRELL W. VOSS

It is certified that error appears in the above-indentified patent and that said Letters Patent is hereby corrected as shown below:

| | |
|---|---|
| 3-13 | 29.39 |
| 3-14 | 11.50 |
| 3-15 | 34 |
| 3-16 | R20.00 |
| 3-17 | 6.00 |
| 3-18 | 26.41 |
| 3-19 | 25.03 |
| 3-20 | 22.10 |
| 3-21 | 13.74 |
| 3-22 | 7.85 |
| 3-23 | 7.89 |
| 3-24 | 0.14 |
| REFERENCE CHARACTER | DIMENSIONS (mm) |
| 3-25 | 6.59 |
| 3-26 | 16.22 |
| 3-27 | 26.42 |
| 3-28 | 25.03 |
| 3-29 | 22.11 |
| 3-30 | 6.97 |
| 3-31 | 0.41 |
| 3-32 | 0.57 |
| 3-33 | 6.12 |
| 3-34 | 7.44 |
| 3-35 | 8.04 |
| 3-36 | 11.50 |
| 3-37 | R2.00 |

UNITED STATES PATENT AND TRADEMARK OFFICE
CERTIFICATE OF CORRECTION

PATENT NO. : 5,377,734

DATED : January 3, 1995

INVENTOR(S) : GARY G. KLEIN and DARRELL W. VOSS

It is certified that error appears in the above-indentified patent and that said Letters Patent is hereby corrected as shown below:

| | |
|---|---|
| 3-38 | 29.50 |
| 3-40 | 3.50 |
| 3-41 | 6.09 |

| REFERENCE CHARACTER | ANGULAR MEASURE (degrees) |
|---|---|
| 3-50 | 10.51° |
| 3-51 | 18.63° |
| 3-52 | 30.93° |
| 3-53 | 35.69° |
| 3-54 | 36.60° |
| 3-55 | 9.33° |
| 3-56 | 0.55° |
| 3-57 | 36.62° |
| 3-58 | 35.60° |
| 3-59 | 30.94° |
| 3-60 | 5.06° |
| 3-61 | 34.26° |
| 3-62 | 4.57° |
| 3-63 | 24.57° |
| 3-64 | 5.06° |
| 3-65 | 34.27° |

In Fig. 4, the dimensional values and angular relationships in the disclosed embodiment are as follows:

UNITED STATES PATENT AND TRADEMARK OFFICE
CERTIFICATE OF CORRECTION

PATENT NO. : 5,377,734

DATED : January 3, 1995

INVENTOR(S) : GARY G. KLEIN and DARRELL W. VOSS

It is certified that error appears in the above-indentified patent and that said Letters Patent is hereby corrected as shown below:

| REFERENCE CHARACTER | DIMENSIONS |
|---|---|
| 4-1 | 1.86 |
| 4-2 | 4.57 |
| 4-3 | 1.87 |
| 4-4 | 0.57 |
| 4-5 | 7.26 |
| 4-6 | 5.74 |
| 4-7 | 0.41 |
| 4-8 | 6.59 |

| REFERENCE CHARACTER | DIMENSIONS |
|---|---|
| 4-11 | .41 |
| 4-12 | 6.97 |
| 4-13 | 12.55 |
| 4-14 | 19.29 |
| 4-15 | 7.89 |
| 4-16 | 7.85 |
| 4-17 | 24.50 |
| 4-18 | 23.20 |
| 4-19 | 20.35 |
| 4-20 | 13.74 |
| 4-21 | 6.09 |
| 4-22 | 7.22 |
| 4-23 | 3.30 |
| 4-25 | 2.25 |
| 4-26 | 5.12 |

UNITED STATES PATENT AND TRADEMARK OFFICE
CERTIFICATE OF CORRECTION

PATENT NO. : 5,377,734
DATED : January 3, 1995
INVENTOR(S) : GARY G. KLEIN and DARRELL W. VOSS It is certified that error appears in the above-indentified patent and that said Letters Patent is hereby corrected as shown below:

| | |
|---|---|
| 4-27 | 6.13 |
| 4-28 | .72 |
| 4-29 | 11.50 |
| 4-30 | R2.00 |

| REFERENCE CHARACTER | ANGULAR MEASURE |
|---|---|
| 4-31 | 26.65° |
| 4-32 | 16.98° |
| 4-33 | .55° |
| 4-34 | 9.33° |
| 4-35 | 10.51° |
| 4-36 | 18.63° |
| 4-37 | 28.25° |
| 4-38 | 32.65° |
| 4-39 | 33.60° |
| 4-40 | 31.81° |
| 4-41 | 5.06° |
| 4-42 | 14.94° |
| 4-43 | 24.57° |
| 4-44 | 5.06° |
| 4-45 | 34.27° |

In Figs. 5, 6, 7 and 9, the dimensional values and angular measure in the disclosed embodiment are as follows:

UNITED STATES PATENT AND TRADEMARK OFFICE
CERTIFICATE OF CORRECTION

PATENT NO. : 5,377,734
DATED : January 3, 1995
INVENTOR(S) : GARY G. KLEIN and DARRELL W. VOSS It is certified that error appears in the above-indentified patent and that said Letters Patent is hereby corrected as shown below:

| REFERENCE CHARACTER | DIMENSION |
|---|---|
| 5-1 | R3.0 |

| | ANGULAR MEASURE (degrees) |
|---|---|
| 5-2 | 10° |
| 5-3 | 10° |

In Fig. 8, the dimensional values and angular measure in the disclosed embodiment are as follows:

| REFERENCE CHARACTER | DIMENSION (meters) |
|---|---|
| 8-1 | R4.0 |

| | ANGULAR MEASURE |
|---|---|
| 8-2 | 10° |
| 8-3 | 10° |

In Fig. 10, the dimensional values and angular measures in the disclosed embodiment are as follows:

UNITED STATES PATENT AND TRADEMARK OFFICE
CERTIFICATE OF CORRECTION

PATENT NO. : 5,377,734
DATED : January 3, 1995
INVENTOR(S) : GARY G. KLEIN and DARRELL W. VOSS It is certified that error appears in the above-indentified patent and that said Letters Patent is hereby corrected as shown below:

| REFERENCE CHARACTER | DIMENSIONS |
|---|---|
| 10-1 | R3.00 |
| 10-2 | R3.00 |
| 10-3 | 2.5 |
| 10-4 | R3.00 |

| | ANGULAR MEASURE |
|---|---|
| 10-5 | 10° |
| 10-6 | 10° |

In Fig. 11A, the radius of curvature of the fillet 11A-1 is 1.00 mm if the side were extended it would follow path 11A-2 with the lines 11A-3 and 11A-4 being perpendicular.

In Fig. 11B, the radius of curvature 11B-1 is 2.00 mm, angle 11B-2 is 30° Point 11B-3 is the bisection point of the side, and lines 11B-4 and 11b-5 are extensions from the side and lines 11B-6 and 11b-7 are perpendicular.

UNITED STATES PATENT AND TRADEMARK OFFICE
CERTIFICATE OF CORRECTION

PATENT NO. : 5,377,734
DATED : January 3, 1995
INVENTOR(S) : GARY G. KLEIN and DARRELL W. VOSS It is certified that error appears in the above-indentified patent and that said Letters Patent is hereby corrected as shown below:

In Fig. 12A, the dimensional values in the disclosed embodiments are as follows:

| REFERENCE CHARACTER | DIMENSIONS (mm) |
|---|---|
| 12A-1 | 8.02 |
| 12A-2 | 14.93 |

| REFERENCE CHARACTER | DIMENSIONS (mm) |
|---|---|
| 12A-3 | 16.24 |
| 12A-4 | 16.31 |
| 12A-5 | 20.73 |
| 12A-6 | 14.96 |
| 12A-7 | 11.81 |
| 12A-8 | 9.25 |
| 12A-9 | 14.34 |
| 12A-10 | 17.21 |
| 12A-11 | 28.77 |
| 12A-12 | 10.49 |
| 12A-13 | 4.40 |
| 12A-14 | 4.53 |
| 12-15 | R15.00 |
| 12-16 | R13.00 |
| 12-17 | R 9.00 |

UNITED STATES PATENT AND TRADEMARK OFFICE
CERTIFICATE OF CORRECTION

PATENT NO. : 5,377,734
DATED : January 3, 1995
INVENTOR(S) : GARY G. KLEIN and DARRELL W. VOSS It is certified that error appears in the above-indentified patent and that said Letters Patent is hereby corrected as shown below:

In Fig. 12B, the dimensional values in the disclosed embodiment are as follows:

| REFERENCE CHARACTER | DIMENSIONS (mm) |
|---|---|
| 12B-1 | 16.58 |
| 12B-2 | 8.45 |
| 12B-3 | 6.95 |
| 12B-4 | 5.65 |
| 12B-5 | 0.75 |
| 12B-6 | 0.55 |
| 12B-7 | 6.96 |
| 12B-8 | 7.71 |
| 12B-9 | 11.91 |
| 12B-10 | 3.38 |
| 12B-11 | 4.13 |
| 12B-13 | 6.08 |
| 12B-14 | R10.00° |
| 12B-15 | R 7.00° |

In Fig. 12C, the dimensional values in the disclosed embodiment are as follows:

| REFERENCE CHARACTER | DIMENSIONS (mm) |
|---|---|
| 12C-1 | 11.43 |

UNITED STATES PATENT AND TRADEMARK OFFICE
CERTIFICATE OF CORRECTION

PATENT NO. : 5,377,734
DATED : January 3, 1995
INVENTOR(S) : GARY G. KLEIN and DARRELL W. VOSS It is certified that error appears in the above-indentified patent and that said Letters Patent is hereby corrected as shown below:

| | |
|---|---|
| 12C-2 | 7.36 |
| 12C-3 | 6.75 |
| 12C-4 | 5.98 |
| 12C-5 | 21.38 |
| 12C-6 | 16.12 |
| 12C-7 | 14.35 |

| REFERENCE CHARACTER | DIMENSIONS (mm) |
|---|---|
| 12C-9 | 13.75 |
| 12C-10 | 26.18 |
| 12C-11 | 12.99 |
| 12C-12 | 14.88 |
| 12C-13 | 18.87 |
| 12C-14 | 8.99 |
| 12C-15 | 7.49 |
| 12C-16 | R15.00 |
| 12C-17 | R15.00 |
| 12C-18 | R 7.00 |

In Fig. 12D, the dimensional values in the disclosed embodiment are as follows:

| REFERENCE CHARACTER | DIMENSIONS (mm) |
|---|---|
| 12D-1 | 17.34 |
| 12D-2 | 15.41 |

UNITED STATES PATENT AND TRADEMARK OFFICE
CERTIFICATE OF CORRECTION

PATENT NO. : 5,377,734

DATED : January 3, 1995

INVENTOR(S) : GARY G. KLEIN and DARRELL W. VOSS

It is certified that error appears in the above-indentified patent and that said Letters Patent is hereby corrected as shown below:

| | |
|---|---|
| 12D-3 | 14.94 |
| 12D-4 | 1.30 |
| 12D-5 | 4.09 |
| 12D-6 | 12.13 |
| 12D-7 | 14.34 |
| 12D-8 | 16.05 |
| 12D-9 | 19.55 |
| 12D-10 | 5.70 |
| 12D-11 | 6.86 |
| 12D-13 | 8.33 |
| 12D-14 | 11.30 |
| 12D-15 | 12.30 |
| 12D-16 | 15.20 |
| 12D-17 | 18.33 |
| 12D-18 | 1.08 |
| 12D-19 | 0.09 |
| 12D-20 | R15.00 |
| 12D-21 | R15.00 |

Signed and Sealed this

Twenty-seventh Day of August, 1996

Attest:

BRUCE LEHMAN

Attesting Officer     Commissioner of Patents and Trademarks